US012804006B2

(12) United States Patent
Ganesan et al.

(10) Patent No.: US 12,804,006 B2
(45) Date of Patent: Nov. 17, 2026

(54) PLUG-IN GENERATION FOR SECURITY TESTING TOOLS USING LARGE LANGUAGE MODELS

(71) Applicant: Palo Alto Networks, Inc., Santa Clara, CA (US)

(72) Inventors: Abisheik Ganesan, Santa Clara, CA (US); Zhibin Zhang, Santa Clara, CA (US); Qi Deng, Sunnyvale, CA (US); Mei Wang, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/919,302

(22) Filed: Oct. 17, 2024

(65) Prior Publication Data

US 2026/0113348 A1 Apr. 23, 2026

(51) Int. Cl.
*H04L 29/06* (2006.01)
*G06F 40/40* (2020.01)
*H04L 9/40* (2022.01)

(52) U.S. Cl.
CPC .......... *H04L 63/1433* (2013.01); *G06F 40/40* (2020.01)

(58) Field of Classification Search
CPC ............................ H04L 63/1433; G06F 40/40
See application file for complete search history.

(56) References Cited

U.S. PATENT DOCUMENTS

| | | | |
|---|---|---|---|
| 2023/0125203 A1 | 4/2023 | Saeed et al. | |
| 2024/0086539 A1* | 3/2024 | Ball, Sr. | G06F 21/552 |
| 2024/0179155 A1 | 5/2024 | Kwak et al. | |
| 2024/0291853 A1* | 8/2024 | Murphy | G06N 3/0475 |
| 2024/0403419 A1 | 12/2024 | Parmar et al. | |
| 2024/0419917 A1* | 12/2024 | Clement | G06N 3/045 |
| 2025/0030611 A1 | 1/2025 | Jarah et al. | |
| 2025/0111271 A1 | 4/2025 | Lee et al. | |
| 2025/0141895 A1 | 5/2025 | Datla et al. | |
| 2026/0005910 A1 | 1/2026 | Stockert et al. | |

OTHER PUBLICATIONS

U.S. Appl. No. 18/919,286, Notice of Allowance mailed Mar. 17, 2026, 11 pages.

* cited by examiner

*Primary Examiner* — Jeffrey C Pwu
*Assistant Examiner* — Thong P Truong
(74) *Attorney, Agent, or Firm* — Gilliam IP PLLC

(57) ABSTRACT

A prompt generator receives descriptive data for a plug-in of a custom or open-source security testing tool. The prompt generator chooses a prompt template corresponding to the type of descriptive data and the security testing tool. For an open-source security testing tool, the prompt generator populates the prompt template with the descriptive data and prompts an open-source large language model (LLM) with the populated prompt to generate the plug-in for the open-source security testing tool. For a custom security testing tool, the prompt generator populates the prompt template with the descriptive data or an existing open source plugin, and prompts a custom LLM with the populated prompt to generate the plug-in for the custom security testing tool.

20 Claims, 11 Drawing Sheets

PLUG-IN GENERATION FOR SECURITY TESTING TOOLS USING LARGE LANGUAGE MODELS

BACKGROUND

The disclosure generally relates to data processing (e.g., CPC subclass G06F) and to computing arrangements based on specific computational models (e.g., CPC subclass G06N).

Security feeds provide data related to cybersecurity vulnerabilities, weaknesses, threats, and exploits across various platforms and websites. Feeds of cybersecurity-related data occur across many disparate data sources and data formats such as blogs, news websites, social media posts, security feeds, etc. posting proof of concept (PoC) code, cybersecurity threat/exploit descriptions, steps to reproduce attacks/exploits, network traffic information and payloads for attacks/exploits, and pseudocode commands that can be in a variety of programming languages (or pseudocode formats). These feeds should be inspected for cybersecurity threat/exploit descriptions including vulnerabilities like Structured Query Language (SQL) injection, cross-site scripting, remote code execution (especially zero-day vulnerabilities) as well as exploits such as command-and-control attacks, data exfiltration attacks, and ransomware installation.

The Stanford Institute for Human-Centered Artificial Intelligence created an interdisciplinary initiative named the Center for Research on Foundation Models. They coined the term "foundation models" to refer to machine learning models "trained on broad data at scale such that they can be adapted to a wide range of downstream tasks." Some models considered foundation models include BERT, GPT-4, Codex, and LLAMA. Foundation models are based on artificial neural networks including generative adversarial networks (GANs), transformers, and variational encoders. For instance, some large language models (LLMs) are based on transformer architecture. An LLM is "large" because the training parameters are typically in the billions. LLMs can be pre-trained to perform general-purpose tasks or tailored to perform specific tasks. Tailoring of language models can be achieved through various techniques, such as prompt engineering and fine-tuning.

BRIEF DESCRIPTION OF THE DRAWINGS

Embodiments of the disclosure may be better understood by referencing the accompanying drawings.

FIG. 3 is a schematic diagram of an example system for generating a plug-in for an open-source security testing tool using descriptive data of the plug-in.

FIG. 4 is a schematic diagram of an example system for generating a plug-in for a custom security testing tool using descriptive data of the plug-in.

DESCRIPTION

Figure 1:
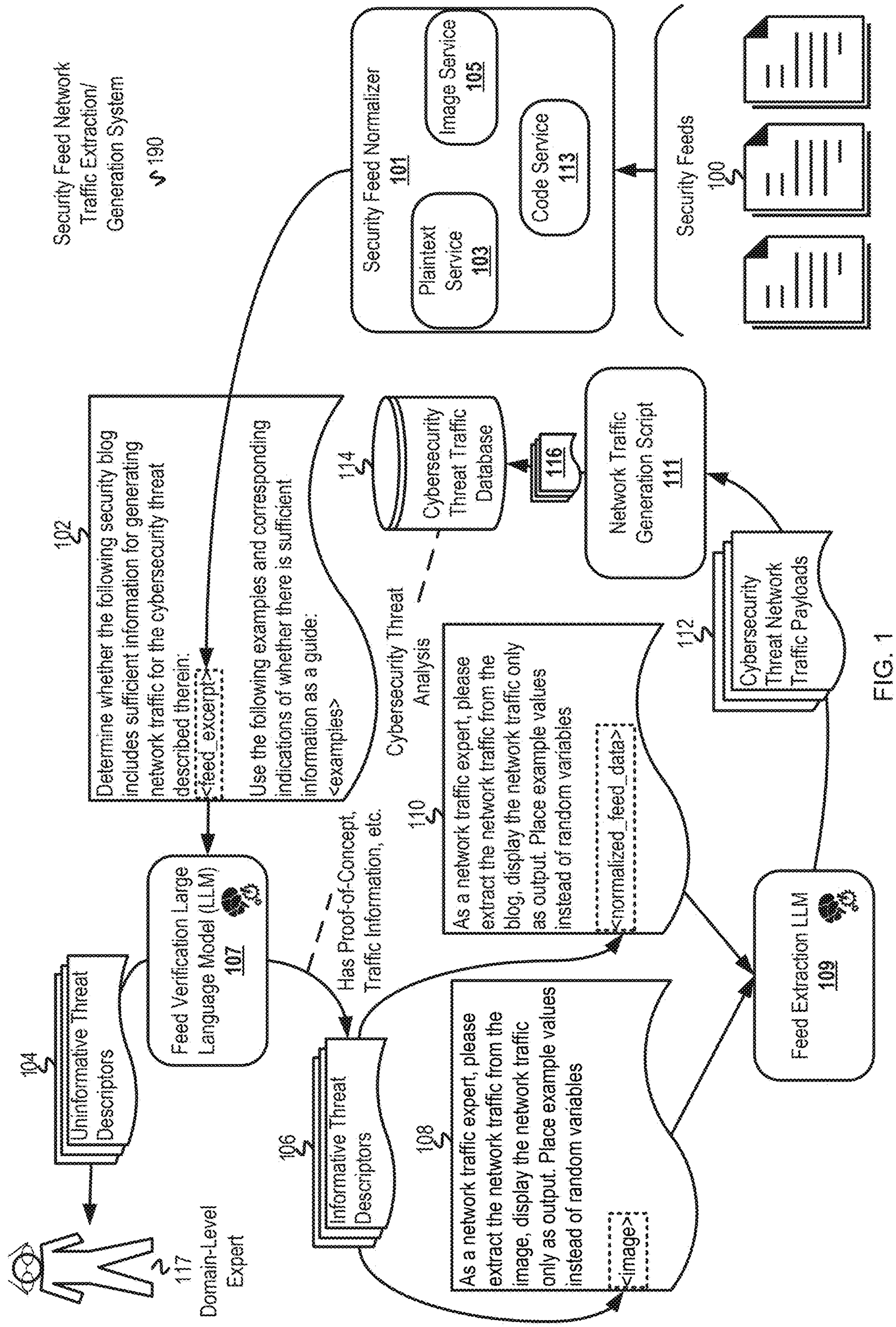
FIG. 1 is a schematic diagram of an example system for aggregating security feeds to extract descriptors of cybersecurity threats and generate network traffic for the cybersecurity threats.

The description that follows includes example systems, methods, techniques, and program flows to aid in understanding the disclosure and not to limit claim scope. Well-known instruction instances, protocols, structures, and techniques have not been shown in detail for conciseness.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

This description refers to "plug-ins" in the context of security testing tools. A "plug-in" for a security testing tool can alternatively be referred to as a script or a module depending on existing terminology defined by the vendor/proprietor of the corresponding security testing tool.

A "threat descriptor" comprises a description of a cybersecurity threat and/or any related weakness(es), vulnerability(ies), or exploit(s) that attackers may use for an attack related to that cybersecurity threat. Similarly, network traffic (e.g., network traffic payloads, packet captures, or other related information) generated for a cybersecurity threat may alternatively comprise network traffic generated for one or more related exploits used to perform an attack for the cybersecurity threat and/or network traffic for related vulnerabilities/weaknesses.

An "open-source" security testing tool refers to any security testing tool for which plug-ins are configurable by the public and functionalities of the security testing tool are accessible and known to the public. This includes security testing tools having proprietary code that enable public access (e.g., accessible via an application programming interface) without direct access to the proprietary code itself.

INTRODUCTION

Security testing tools are configured to implement plug-ins that specify additional functionality such as network traffic scanning, weakness/vulnerability/exploit detection, penetration testing, static/dynamic application security testing, etc. These plug-ins are defined according to the corresponding programming language, schema, and/or format for which security testing tool is written, and often vary across security testing tools/vendors. A practitioner attempting to implement an existing plug-in in a target security testing tool with which they are not familiar (for instance, to leverage the functionality of the target security testing tool) may lose significant efficiency due to having to learn the schema/format/programming language of plug-ins for the target security testing tool. Moreover, many organizations or other entities may use custom (e.g., proprietary) security testing tools with their own plug-in formats and programming languages which are not a priori known to domain-level experts.

Overview

The present disclosure proposes a framework for using LLMs to generate plug-ins for open-source and custom security testing tools based on data that is descriptive of the generated plug-ins. The descriptive data includes PoC code, example network traffic payloads/captures, plug-ins for other security testing tools, etc. A prompt generator collects descriptive data for a desired plug-in of a security testing tool and determines if the security testing tool is open-source or custom (e.g., proprietary). For an open-source security testing tool, the prompt generator populates a first prompt comprising instructions to either convert a plug-in provided by the descriptive data to a plug-in for the open-source security testing tool, or to leverage the other types of descriptive data to generate a plug-in for the open-source security testing tool. An LLM trained/adapted to generate plug-ins for open-source security testing tools receives the populated prompt and outputs a plug-in for the open-source security testing tool.

When the prompt generator determines that the corresponding security testing tool for the desired plug-in is a custom security testing tool, the prompt generator obtains an example plug-in for an open-source testing tool that differs from the custom security testing tool using the LLM according to the foregoing description. The prompt generator then inserts the example plug-in as well as the descriptive data for the desired plug-in to a second prompt. The second prompt comprises instructions to convert or otherwise generate a plug-in for the custom security testing tool according to the descriptive data and example plug-in, and also includes a description of the custom security testing tool such as functionalities provided by the custom security testing tool, format/schema/programming languages for plug-ins of the custom security testing tool, a programming language that was used to build the custom security testing tool, etc. This system of automated plug-in generation for both open-source and custom security testing tools using descriptive data allows for domain-level security experts to develop plug-ins for security testing tools in real time, allowing for fast analysis of attack variants, mitigation actions, and other remediation actions for zero-day vulnerabilities as they are detected.

Example Illustrations

FIG. 1 is a schematic diagram of an example system for aggregating security feeds to extract descriptors of cybersecurity threats and generate network traffic for the cybersecurity threats. A security feed network traffic extraction/generation system 190 comprises a security feed normalizer 101, a feed verification LLM 107, a feed extraction LLM 109, and a network traffic generation script 111. The security feed normalizer 101 receives security feeds 100 across various data sources and formats and normalizes the security feeds 100 to generate excerpts comprising threat descriptors of cybersecurity threats described in the security feeds 100. The security feed normalizer 101 then populates prompts for the feed verification LLM 107 that prompt the feed verification LLM 107 to determine whether each threat descriptor is informative. A threat descriptor is considered in formative if it comprises sufficient information that can be used to generate network traffic for a corresponding cybersecurity threat. The feed verification LLM 107 forwards uninformative threat descriptors 104 to a domain-level expert 117 for further analysis. The feed verification LLM 107 uses informative threat descriptors 106 to populate prompts for the feed extraction LLM 109. The feed extraction LLM 109 extracts and/or generates cybersecurity threat network traffic payloads ("payloads") 112 for each cybersecurity threat based on the informative threat descriptors 106 and communicates the payloads 112 to the network traffic generation script 111. The network traffic generation script 111 generates network traffic 116 for each cybersecurity threat using the payloads 112 and stores the network traffic 116 in a cybersecurity threat traffic database 114. The cybersecurity threat traffic database 114 is then used for cybersecurity threat analysis, prevention, and mitigation.

The security feeds 100 comprise feeds of data related to cybersecurity threats across a variety of data sources such as technical writeups, blogs, online vulnerability databases/catalogs, email or comment threads, etc. that include data having a variety of types such as PoC code, example network payloads, HyperText Transfer Protocol (HTTP) headers, pseudocode, etc. with a variety of formats such as plaintext, image data, program code for a variety of programming languages, pseudocode, etc. The data related to cybersecurity threats can describe vulnerabilities, exploits enabled by those vulnerabilities, weaknesses that could potentially lead to vulnerabilities, attack stages related to cybersecurity threats, etc. The security feed normalizer 101 or separate component that aggregates data across the security feeds 100 can comprise a web crawling component that crawls websites for known security feeds and can additionally crawl the Internet for keywords such as vulnerability identifiers to obtain data for cybersecurity threats related to those vulnerabilities. For any data crawled from websites from the security feeds 100, the security feed normalizer 101 obtains corresponding HTTP responses and renders those HTTP responses (e.g., in a web browser) to obtain data therein, and/or extracts HyperText Markup Language (HTML) data, Cascading Style Sheets (CSS) data, etc. and any additional data therein such as JavaScript® code (or other executable code), plaintext data, images, etc. to include in aggregate data from the security feeds 100.

In some embodiments, the security feed normalizer 101 can filter data from the security feeds that is unlikely to correspond to a cybersecurity threat. For instance, the security feed normalizer 101 can do a keyword search of blog posts to determine whether the blog posts include certain keywords such as "vulnerability," "exploit," "threat," etc. and can filter those blog posts not having those keywords as not corresponding to cybersecurity threats. Additionally, the security feed normalizer 101 can filter data corresponding to exploits/vulnerabilities below a threshold security risk score (e.g. a threshold Common Vulnerability Scoring System (CVSS) score). Other custom filtering criteria can be applied such as filtering exploit/vulnerability data for exploits/vulnerabilities known to not be relevant to certain products (e.g., filtering exploits/vulnerabilities not associated with the Microsoft® Windows® 11 operating system). Filtering can additionally comprise deduplication to remove threat descriptors that are identical across security feeds.

As the security feeds 100 are aggregated, the security feed normalizer 101 identifies each threat descriptor from the aggregated data. This can be according to known formats for threat descriptors from each data source of the security feeds 100. For instance, for a blog website, the security feed normalizer 101 can have prior knowledge of subdomains and/or formats for blog posts on the blog website (as opposed to a home page that lists hyperlinks to blog posts) and can identify threat descriptors as corresponding to those web pages (i.e., HTTP responses received by the web crawling component for those web pages). Similarly, the security feed normalizer 101 can have knowledge of uniform resource locator (URL) formats for vulnerabilities cataloged by a vulnerability cataloging website and can identify threat descriptors as corresponding to each web page for a URL of this known format.

As the security feed normalizer 101 identifies threat descriptors across the security feeds 100 (e.g., as the data is crawled by a web crawling component), the security feed normalizer 101 uses a plaintext service 103, an image service 105, and a code service 113 to normalize threat descriptors from the security feeds 100 into respective standard formats. The security feed normalizer 101 determines a normalized format(s) of each threat descriptor and applies the plaintext service 103, the image service 105, and/or the code service 113 to obtain the normalized format(s). For instance, image data can be converted into a standard image format by the image service 105. The plaintext service 103 can process text data from HTML and/or CSS code to obtain plaintext. The code service 113 can identify and convert code contained in scripts/executables into plaintext. The security feed normalizer 101 can have a standardized output format that inserts plaintext, images, and code into certain locations in the output (e.g., using an output template) to normalize threat descriptors across the security feeds 100 and improve consistency/quality of the remaining operations. Moreover, the standardized output format can be configured based for each of the security feeds 100 based on known format of crawled web pages.

The security feed normalizer 101 inserts feed excerpts corresponding to normalized threat descriptors into an example prompt template 102 that comprises the following text:

Determine whether the following security blog includes sufficient information for recreating network traffic for the cybersecurity threat described therein:

<feed_excerpt>

Use the following examples and corresponding indications of whether there is sufficient information as a guide:

<examples>

In the example prompt template 102, the corresponding data source/security feed is specified as a security blog and the normalized threat descriptor is inserted into the "<feed_excerpt>" field. The type of data source/security feed can be determined by the security feed normalizer 101 (e.g., according to a known data source type based on the corresponding website that was crawled), and the security feed normalizer 101 can determine a prompt template to use according to the data source type. For instance, a different prompt template specifying that the threat descriptor is from a vulnerability cataloging website can be used when the data source is the vulnerability cataloging website. The "<examples>" field in the example prompt template 102 specifies examples of security blog threat descriptors and corresponding indications of whether those threat descriptors are informative or uninformative, i.e., whether they contain sufficient PoC code or other network traffic-related data to enable reproduction and/or generation of network traffic for the cybersecurity threats described by the threat descriptors. These examples can be manually generated by a domain-level expert (e.g., the domain-level expert 117). Although the example prompt template 102 has the examples provided therein, in some embodiments the feed verification LLM 107 can obtain example threat descriptors and indications of them being informative or uninformative from its conversation history, e.g., by fine-tuning for the task of determining whether threat descriptors are informative or uninformative. The example prompt template 102 can comprise additional data such as syntax that helps the feed verification LLM 107 to delineate between prompt sections and instructions for format of its output. As an example, the feed verification LLM 107 can be fine-tuned with the following examples:

{"prompt": "Here is a security blog: <security_blog1>", "completion": "yes, because the feed contains the HTTP request payload"}

{"prompt":"Here is a security blog: <security_blog2>", "completion": "no, because there is no network payload present in this feed"}

The above examples can be handpicked by domain level experts and are provide additional explanation to the feed verification LLM 107 because each example provides, in addition to an indication of whether each security blog is informative (as indicated by "completion": "yes . . . " or "completion": "no . . . "), a reason for why that security blog is informative or uninformative.

The feed verification LLM 107 receives the example prompt template 102 populated with the feed excerpt and examples and determines whether the threat descriptor in the feed excerpt is informative or uninformative. The feed verification LLM 107 can comprise an off-the-shelf LLM such as the OpenAIR GPT-4 LLM, the Meta® Llama 3 LLM, the Vertex AIR code-bison model, etc. that is fine-tuned or otherwise adapted via prompt engineering for the task of determining whether threat descriptors are informative or uninformative. Other types of foundation models and language models, such as transformer-based neural networks configured for classifying threat descriptors as informative or uninformative, are additionally anticipated. The feed verification LLM 107 forwards the uninformative threat descriptors 104 determined to be uninformative for network traffic generation to the domain-level expert 117 for additional analysis. The additional analysis can comprise whether there is salient information related to exploits/vulnerabilities in the uninformative threat descriptors 104.

For the informative threat descriptors 106, the feed verification LLM 107 determines a prompt template into which to insert each of the informative threat descriptors 106 and inserts each informative threat descriptor into the determined prompt template. The prompt templates correspond to types of data contained in threat descriptors (e.g., types of data identified by the security feed normalizer 101) and/or types of data sources where the threat descriptors were obtained. FIG. 1 depicts two example prompt templates: an image prompt template 108 for threat descriptors comprising image data, and a blog prompt template 110 for threat descriptors extracted from a security blog. Example prompt template 108 comprises the text (where the image data is inserted into the "<image>" field):

As a network traffic expert, please extract the network traffic from the image, display the network traffic only as output. Place example values instead of random variables <image>

Example prompt template 110 comprises the text (wherein normalized data in the threat descriptor is inserted into the "<normalized_feed_data>" field: As a network traffic expert, please extract the network traffic from the blog, display the network traffic only as output. Place example values instead of random variables <normalized_feed_data>

The feed extraction LLM 109 receives prompts from prompt templates populated with the informative threat descriptors 106 as input and outputs cybersecurity threat network traffic payloads 112 for network traffic. The feed extraction LLM 109 can comprise an LLM pretrained on general language tasks that has knowledge of program code in various programming languages, pseudocode, threat descriptions, etc. as well as format of network traffic payloads. As such, when the feed extraction LLM 109 is tuned or configured to generate network traffic payloads from threat descriptors, the feed extraction LLM 109 is able to analyze pseudocode to perform corresponding algorithms described by the pseudocode, execute PoC code of various programming languages, extract or otherwise generate network traffic from plaintext descriptions, etc. Moreover, the feed extraction LLM 109 can be chosen as an LLM or other foundation model that is specifically designed/trained to handle code (e.g., the Vertex AI code-bison model).

A network traffic generation script 111 receives the cybersecurity threat network traffic payloads 112 from the feed extraction LLM 109 and generates network traffic 116 for each corresponding cybersecurity threat. For instance, the network traffic 116 can be formatted as packet captures (e.g., Packet Capture (PCAP) files), and the network traffic generation script 111 can be a script that generates packet captures as the network traffic.

The network traffic 116 is stored in the cybersecurity threat traffic database 114 for subsequent cybersecurity threat analysis. For instance, one or more associated cybersecurity systems (e.g., cloud-based firewalls) can generate intrusion prevention system (IPS) signatures, determine mitigation actions to perform, test for evasions, etc. and then deploy remediations resulting from this analysis across firewalls/endpoint devices to prevent/mitigate the associated cybersecurity threats.

Although depicted as distinct LLMs 107, 109, in some embodiments, a single LLM may be used both to determine if a threat descriptor is informative and, if the threat descriptor is informative, to extract network traffic from the threat descriptor. The prompt for the single LLM can comprise an amalgamation of the prompts used for the LLMs 107, 109 and can include modified instructions to only extract network traffic from the threat descriptor if the threat descriptor is determined to be informative.

Figure 2:
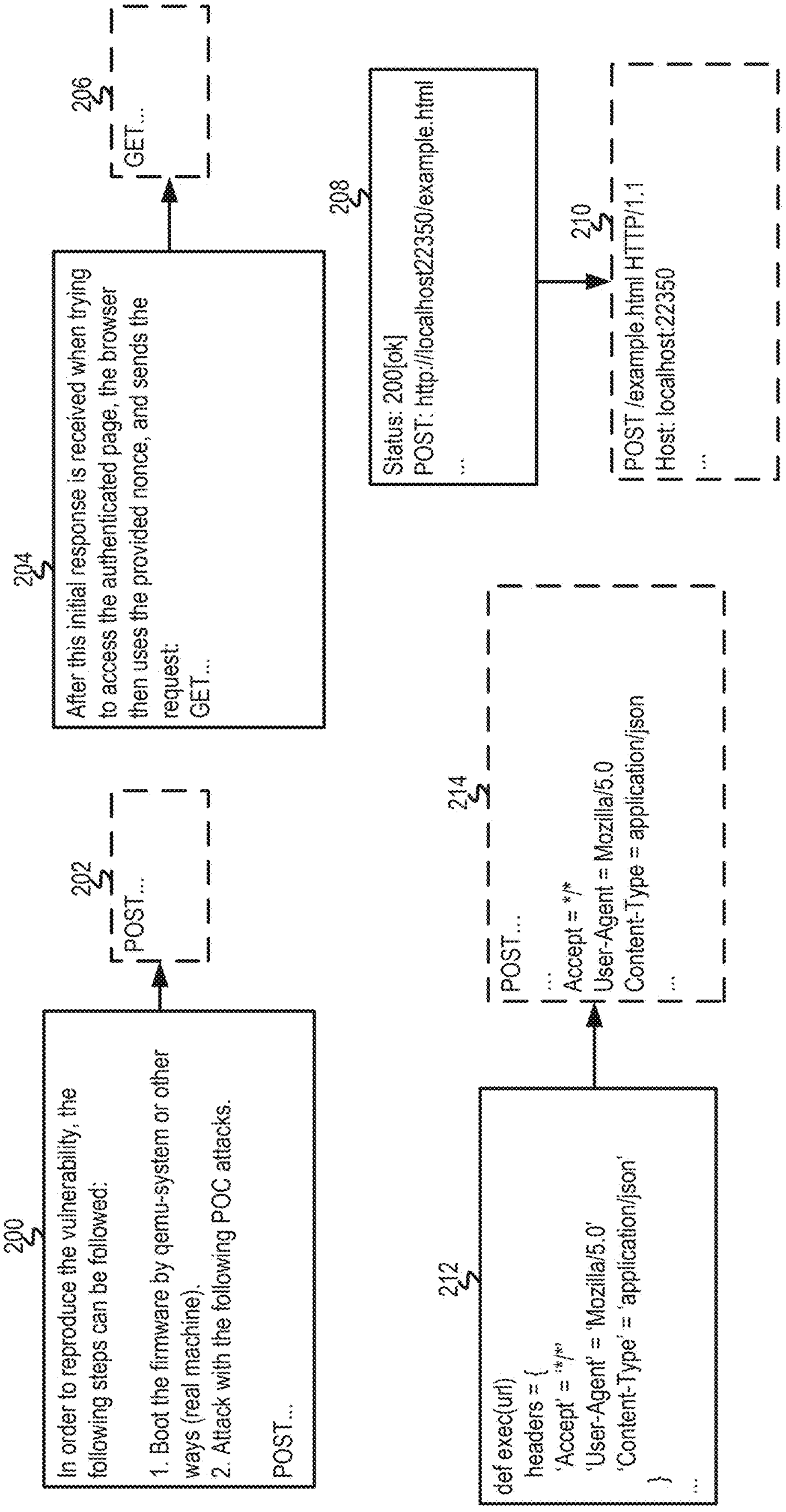
FIG. 2 an illustrative diagram of example threat descriptors from security feeds and corresponding network traffic generated from the threat descriptors.

FIG. 2 an illustrative diagram of example threat descriptors from security feeds and corresponding network traffic generated from the threat descriptors. Example threat descriptor 200 comprises the following description of a vulnerability and an HTTP POST request that exploits the vulnerability: In order to reproduce the vulnerability, the following steps can be followed:

1. Boot the firmware by qemu-system or other ways (real machine).
2. Attack with the following POC attacks.

POST . . .

Example network traffic 202 generated for the example threat descriptor 200 comprises the HTTP POST request "POST . . . " specified in the example threat descriptor 200.

Example threat descriptor 204 comprises the following threat description and corresponding HTTP GET request:

After this initial response is received when trying to access the authenticated page, the browser then uses the provided nonce, and sends the request:

GET . . .

Example network traffic 206 generated for the example threat descriptor 204 comprises the HTTP GET request "GET . . . " specified in the example threat descriptor 204.

Example threat descriptor 208 comprises the following PoC network traffic session represented as pseudocode:

Status: 200 [ok]

POST: http://localhost22350/example.html

Example network traffic 210 generated from for the threat descriptor 208 comprises the HTTP POST request (no longer represent as pseudocode):

POST/example.html HTTP 1.1

Host: localhost: 22350

Example threat descriptor 212 comprises the following Python code which specifies acceptable header field values within a Python function "exec(url)": def exec(url)

```
    headers = {
      'Accept' = '*/*'
      'User-Agent' = 'Mozilla/5.0'
      'Content-Type' = 'application/json'
    }
...
```

Example network traffic 214 generated for the example threat descriptor 212 comprises the following HTTP POST request having the same acceptable header field values indicated by the above Python function:

POST . . .

```
. . .
Accept = */*
User-Agent = Mozilla/5.0
Content-Type = application/json
...
```

Additional examples of threat descriptors include images and corresponding generated network traffic. The network traffic can be generated using image detection of characters within the images (e.g., using Optical Character Recognition functionalities of LLMs).

Figure 3:
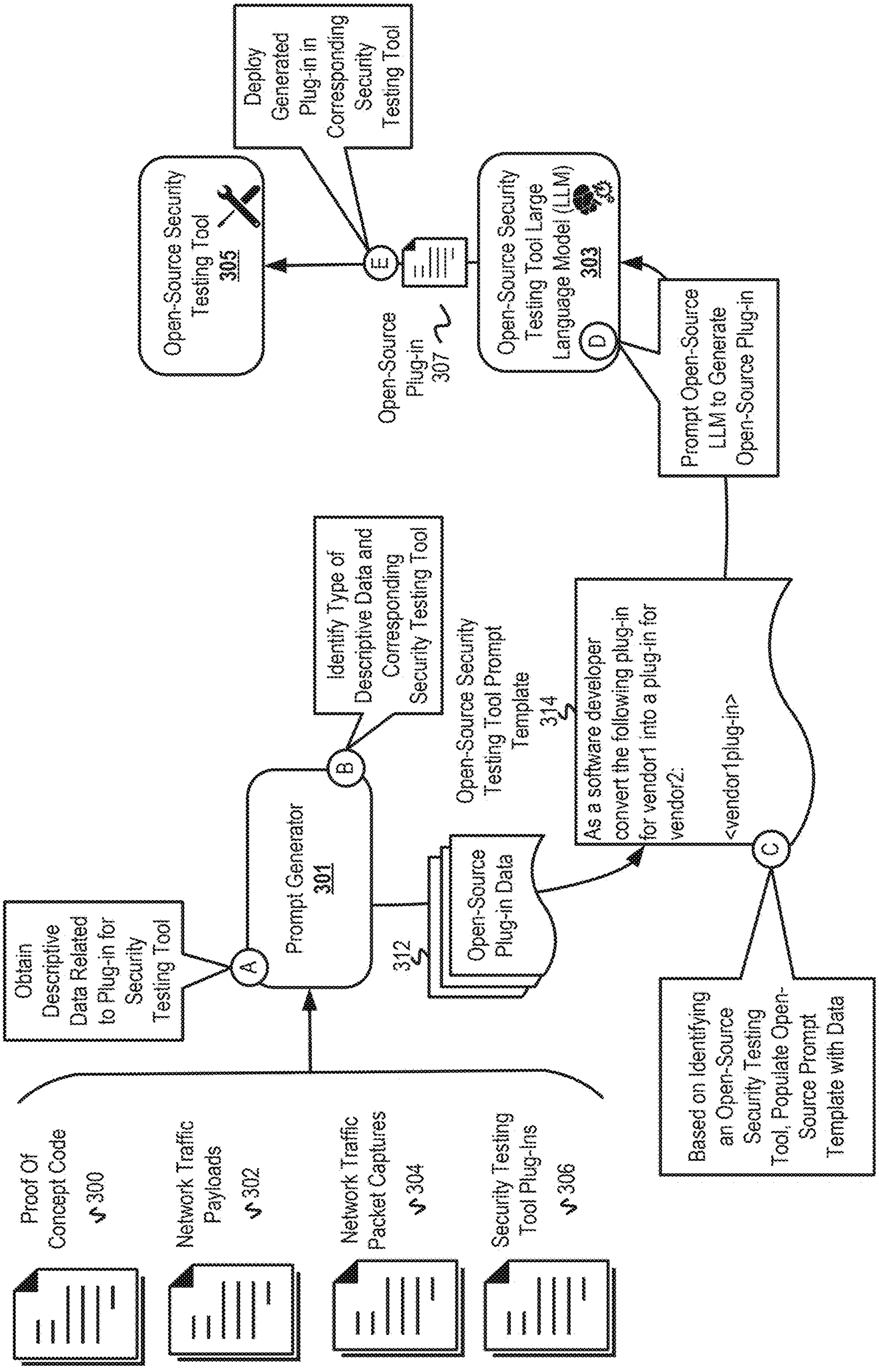
Figure 4:
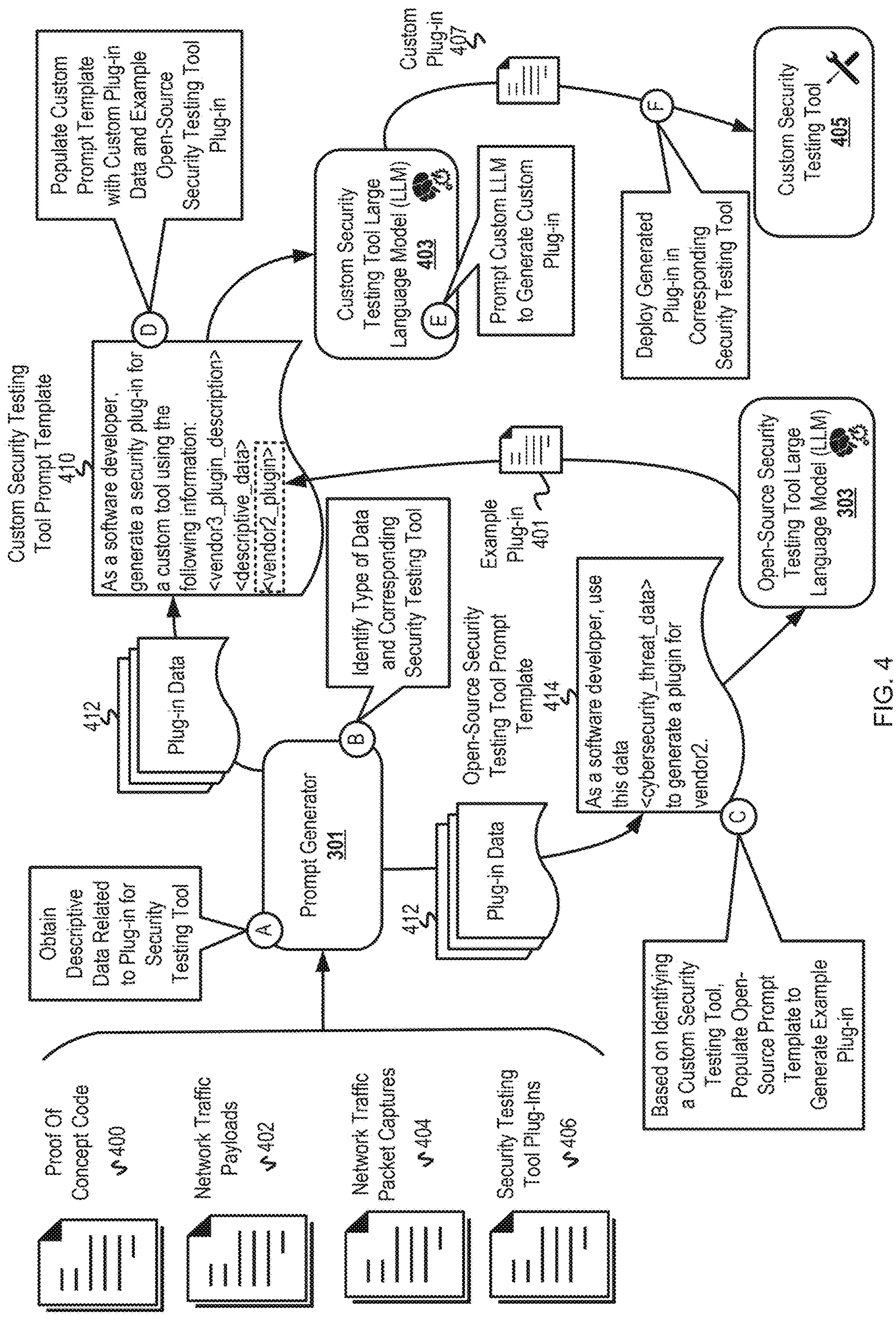

FIGS. 3 and 4 are schematic diagrams of generating plug-ins for open-source and custom security testing tools, respectively, using LLMs and descriptive data for a security testing tool plug-in. The operations in FIGS. 3 and 4 can use network traffic generated for cybersecurity threats as described in the foregoing as input descriptive data for generating plug-ins for open-source and custom security testing tools. An end-to-end pipeline implementing all of these operations can aggregate and normalize threat descriptors from security feeds, generate network traffic of cybersecurity threats for those of the threat descriptors that are informative, and generate plug-ins for security testing tools using the generated network traffic.

FIG. 3 is annotated with a series of letters A-E, and FIG. 4 is annotated with a series of letters A-F. Each stage represents one or more operations. Although these stages are ordered for these examples, the stages illustrate one example to aid in understanding this disclosure and should not be used to limit the claims. Subject matter falling within the scope of the claims can vary from what is illustrated.

FIG. 3 is a schematic diagram of an example system for generating a plug-in for an open-source security testing tool using descriptive data of the plug-in. At stage A, a prompt generator 301 receives descriptive data of a plug-in for a security testing tool. The descriptive data includes at least one of PoC code 300, network traffic payloads 302, network traffic captures 304, and security testing tool plug-ins 306. For instance, the prompt generator 301 can receive the descriptive data via a user interface accessed by a domain-level security expert attempting to convert an existing plug-in or generate a plug-in for a specified security testing tool. The user interface can comprise a dropdown menu or other selective user interface element for choosing the desired security testing tool. Moreover, when the descriptive data comprises a plug-in (i.e., a configuration file, script, or other populated schema that defines a plug-in for a corresponding security testing tool), the user interface can specify a security testing tool for the input plug-in in addition to the desired security testing tool plug-in for the output. In some embodiments, for instance when the desired plug-in performs vulnerability scanning for one or more vulnerabilities, the descriptive data can comprise the network traffic generating using security feeds according to the foregoing description. The descriptive data is referenced as open-source plug-in data 312 in FIG. 3.

At stage B, the prompt generator 301 identifies the type of the open-source plug-in data 312 and the security testing tool indicated therein. The type of the open-source plug-in data 312 may be indicated by the domain-level expert at the user interface and/or inferred by the prompt generator 301 based on a format of the open-source plug-in data 312. In the example depicted in FIG. 3, the identified security testing tool is an open-source security testing tool 305 (e.g., the Nmap® network scanner, the Metasploit® Project, the Open Vulnerability Assessment Scanner, etc.). The prompt generator 301 then identifies a prompt template corresponding to the open-source security testing tool 305 and the type the open-source plug-in data 312.

At stage C, the prompt generator 301 populates the identified prompt template with the open-source plug-in data 312. Example open-source security testing tool prompt template 314 identified by the prompt generator 301 comprises the text:

As a software developer convert the following plug-in for vendor1 into a plug-in for vendor2:

<vendor1plug-in>

The example prompt template 314 is chosen by the prompt generator 301 based on the open-source testing tool for vendor2 being identified in the open-source plug-in data 312, and the data type for the open-source plug-in data 312 is a configuration file, script, or other code that enables implementation of a plug-in (alternatively, simply a plug-in data type). In addition to the above instructions, the example prompt template 314 (or any of the other prompt templates corresponding to open-source security testing tools) can additionally comprise metadata of the open-source security testing tool 305 and can specify built-in functionalities of the open-source security testing tool 305 such as payload generation services for attacks based on vulnerability descriptions.

At stage D, the prompt generator 301 prompts an open-source security testing tool LLM 303 to generate an open-source plug-in 307 based on the example prompt template 314 populated with the open-source plug-in data 312. The open-source security testing tool LLM 303 can be prompt-tuned and/or few-shot prompted with examples of descriptive data and corresponding plug-ins for one or more security testing tools including the open-source security testing tool 305. In some embodiments, the open-source security testing tool LLM 303 can additionally be prompt-tuned with instructions describing the format, programming languages, etc. for plug-ins of the one or more security testing tools. Depending on implementations, one LLM can be used across security testing tools or multiple LLMs can be used for subsets of security testing tools.

At stage E, the open-source security testing tool 305 deploys the open-source plug-in 307. The open-source security testing tool 305 performs functionality according to the open-source plug-in 307 for security testing such as generating payloads, encodings, evasion techniques, etc. to create new attack/exploit variants, scan existing network traffic to identify attacks/vulnerabilities, etc. When the open-source plug-in 307 is related to an attack or vulnerability, the open-source security testing tool 305 can perform built-in functionalities for analyzing the attack or vulnerability in various attack/exploit scenarios.

In some embodiments, prior to the operations at stage E, a domain-level expert that submitted the descriptive data (i.e., the open-source plug-in data 312) may inspect the open-source plug-in 307 to ensure that its functionality is according to the functionality described in the descriptive data. When the functionality is incorrect, or the open-source security testing tool 305 encounters errors when attempting to run the open-source plug-in 307 (e.g., via syntax errors), the open-source security testing tool LLM 303 can be re-prompted with the same prompt to leverage the temperature (i.e., randomness) of the open-source security testing tool LLM 303 in an attempt to generate an open-source plug-in that has the correct functionality and is able to run on the open-source security testing tool 305.

FIG. 4 is a schematic diagram of an example system for generating a plug-in for a custom security testing tool using descriptive data of the plug-in. Many of the operations described in reference to FIG. 4 have concise descriptions due to overlap with operations described in reference to FIG. 3.

At stage A, the prompt generator 301 obtains descriptive data (identified in FIG. 4 as plug-in data 412) related to a plug-in for a security testing tool. The descriptive data comprises at least one of PoC code 400, network traffic payloads 402, network traffic captures 404, and security testing tool plug-ins 406.

At stage B, the prompt generator 301 identifies a type(s) of the plug-in data 412 (e.g., PoC code, network traffic payloads/captures, plug-ins, etc.) and a corresponding security testing tool. The type of the plug-in data 412 and the security testing tool can be indicated by a domain-level expert requesting plug-in generation via a user interface. In the example depicted in FIG. 4, the identified security testing tool is a custom security testing tool 405.

At stage C, the prompt generator 301 populates an open-source security testing tool prompt template 414 with the plug-in data 412, wherein the example prompt template 414 comprises instructions for generating an example plug-in 401 for an open-source security testing tool. The open-source security testing tool can comprise a security testing tool that is well-understood by the open-source security testing tool LLM 303 (e.g., the open-source security testing tool 305) and is used to augment subsequent data used to generate a plug-in for the custom security testing tool 405. The prompt generator 301 populates the example prompt template 414 with the plug-in data 412 and prompts the open-source security testing tool LLM 303 with the populated example prompt template 414 to generate the example plug-in 401. The example prompt template 414 comprises the text (where the plug-in data 412 is inserted into the "<cybersecurity_threat_data>" field and vendor2 is the vendor of the open-source security testing tool):

As a software developer, use this data
<cybersecurity_threat_data>
to generate a plugin for vendor2.

At stage D, the prompt generator 301 populates a custom security testing tool prompt template 410 with the plug-in data 412 and the example plug-in 401. The example prompt template 410 comprises the text (where the plug-in data 412 is inserted into the "<descriptive_data>" field, vendor3 is the vendor of the custom security testing tool 405, and the example plug-in is inserted into the "<vendor2_plugin>" field): As a software developer, generate a security plug-in for a custom tool using the following information:

```
<vendor3_plugin_description>
<descriptive_data>
<vendor2_plugin>
```

The description of the plug-in for the custom security testing tool 405 in the example prompt template 410 ("<vendor3_plugin_description>") can include a plug-in format/schema, preferred libraries of the plug-in, plug-in metadata, functionalities of the custom security testing tool 405, a programming language used to generate the plug-in and/or the custom security testing tool 405, etc.

At stage E, the prompt generator 301 prompts a custom security testing tool LLM 403 with the example prompt template 410 populated with the plug-in data 412 and the example plug-in 401 to generate a custom plug-in 407. The custom security testing tool LLM 403 can be prompt-tuned and/or fine-tuned or otherwise adapted to (e.g., via examples provided in engineered prompts) to generate plug-ins for the custom security testing tool 405, for instance as described in the foregoing in reference to FIG. 3. At stage F, the custom security testing tool 405 deploys the example plug-in 401. The custom security testing tool 405 can utilize/perform built-in functionalities when running the example plug-in 401 for security testing, for example as described in the foregoing in reference to FIG. 3.

FIG. 4 depicts generating an example plug-in for an open-source security testing tool to use to populate a prompt template when generating a custom plug-in for a custom security testing tool. For instance, a prompt template for prompting the custom security testing tool LLM 403 can only take the plug-in data 412 (which may or may not include an existing plug-in) as input. When the plug-in data 412 already comprises an existing plug-in, the operations at stage C can be omitted.

Figure 5:
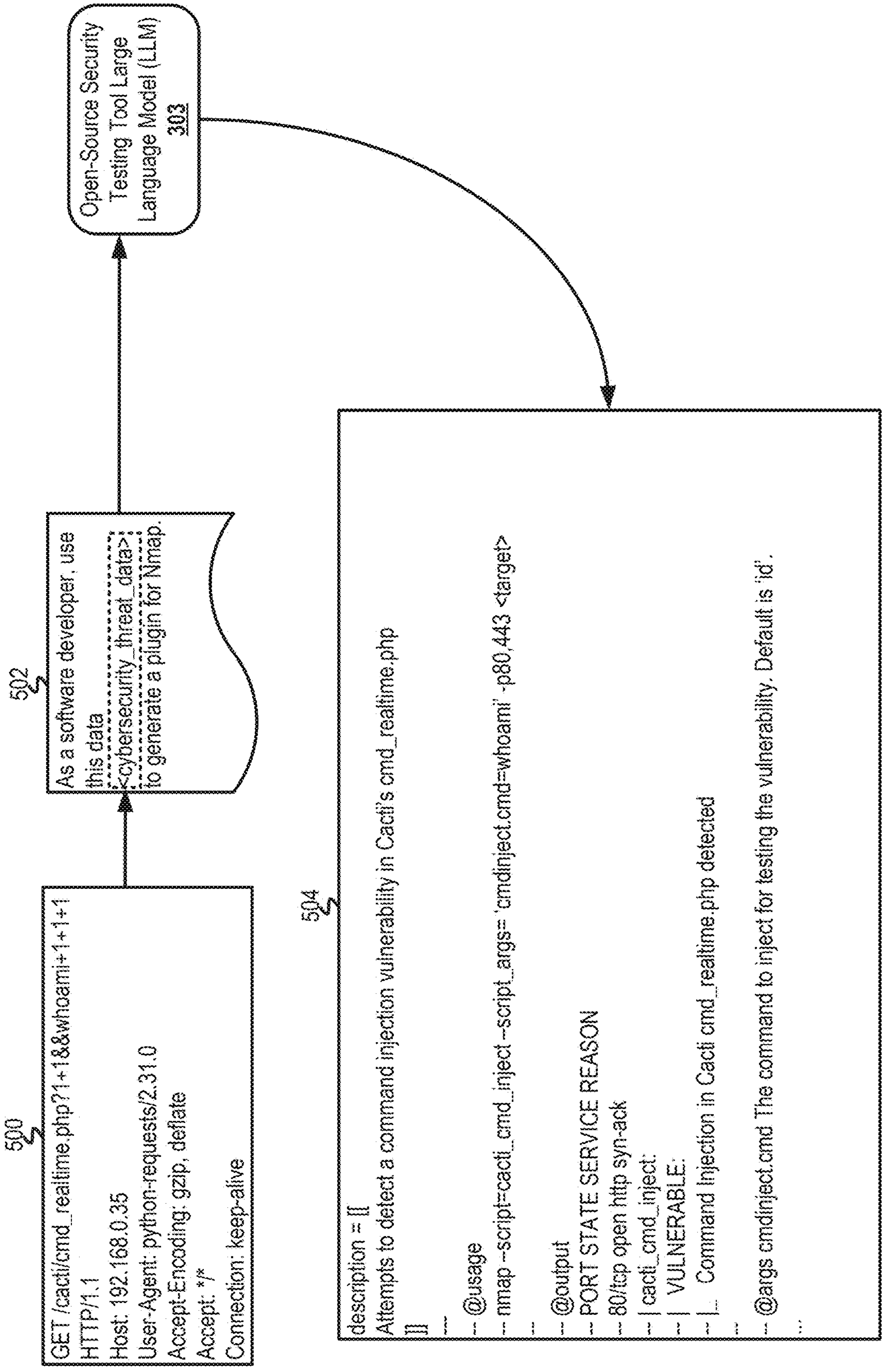
FIG. 5 is an illustrative diagram of an example plug-in for an open-source security testing tool generated from network traffic using an LLM.

FIG. 5 is an illustrative diagram of an example plug-in for an open-source security testing tool generated from network traffic using an LLM. Example network traffic 500 comprises the following HTTP GET request:

```
GET /cacti/cmd_realtime.php?1+1&&whoami+1+1+1 HTTP/1.1
Host: 192.168.0.35
User-Agent: python-requests/2.31.0
Accept-Encoding: gzip, deflate
Accept: */*
Connection: keep-alive
```

The example network traffic 500 comprises network traffic for a command injection vulnerability of the cmd_realtime.php function of the Cacti® round-robin database tool (RRDtool). An example prompt template 502 chosen by a prompt generator for the example network traffic 500 comprises the following text (where the example network traffic 500 is inserted to the "<cybersecurity_threat_data>" field):

As a software developer, use this data
<cybersecurity_threat_data>
to generate a plugin for Nmap.

The example prompt template 502 corresponds to the descriptive data being network traffic and the target open-source security testing tool being the Nmap network scanner. The open-source security testing tool LLM 303 receives the example prompt template 502 populated with the example network traffic 500 as input and outputs an example Nmap script 504 (formatted according to the proprietary script format for the Nmap network scanner) comprising the text:

```
description = [[Attempts to detect a command injection
vulnerability in Cacti's cmd_realtime.php
]]
---
-- @usage
-- nmap -script=cacti_cmd_inject -script_args=
'cmdinject.cmd=whoami' -p80,443 <target>
--
-- @output
-- PORT STATE SERVICE REASON
-- 80/tcp open http syn-ack
-- | cacti_cmd_inject:
-- |   VULNERABLE:
-- |_    Command Injection in Cacti cmd_realtime.php detected
--
-- @args cmdinject.cmd The command to inject for testing the
vulnerability. Default is 'id'.
...
```

As an additional example, the custom security testing tool LLM 403 can receive a prompt template populated with the network traffic 500 as input and output the following plug-in defined for a custom security testing tool implemented in Python: exploit_cacti(target_url):

```
# Attempts to exploit a command injection vulnerability in a Cacti instance.
#Args:
#     target_url (str): The URL of the Cacti instance, including the path to the vulnerable
#script.
#Returns:
#     str: The output of the injected command if successful, otherwise None.
for payload in payloads:
   url = f"{target_url}?1+1&&{payload}+1+1+1"
  headers = {
     'User-Agent' : 'python-requests/2.31.0' ,
     'Accept-Encoding': 'gzip, deflate' ,
     'Accept': '*/*' ,
     'Connection' : 'keep-alive'
```

-continued

```
}
try:
   response = requests.get(url, headers=headers)
   if payload in response.txt:
     return f"Command injection successful! Output: {response.text}"
expect Exception as e:
   print(f"Error during request: {e}")
```

return None

Figure 6:
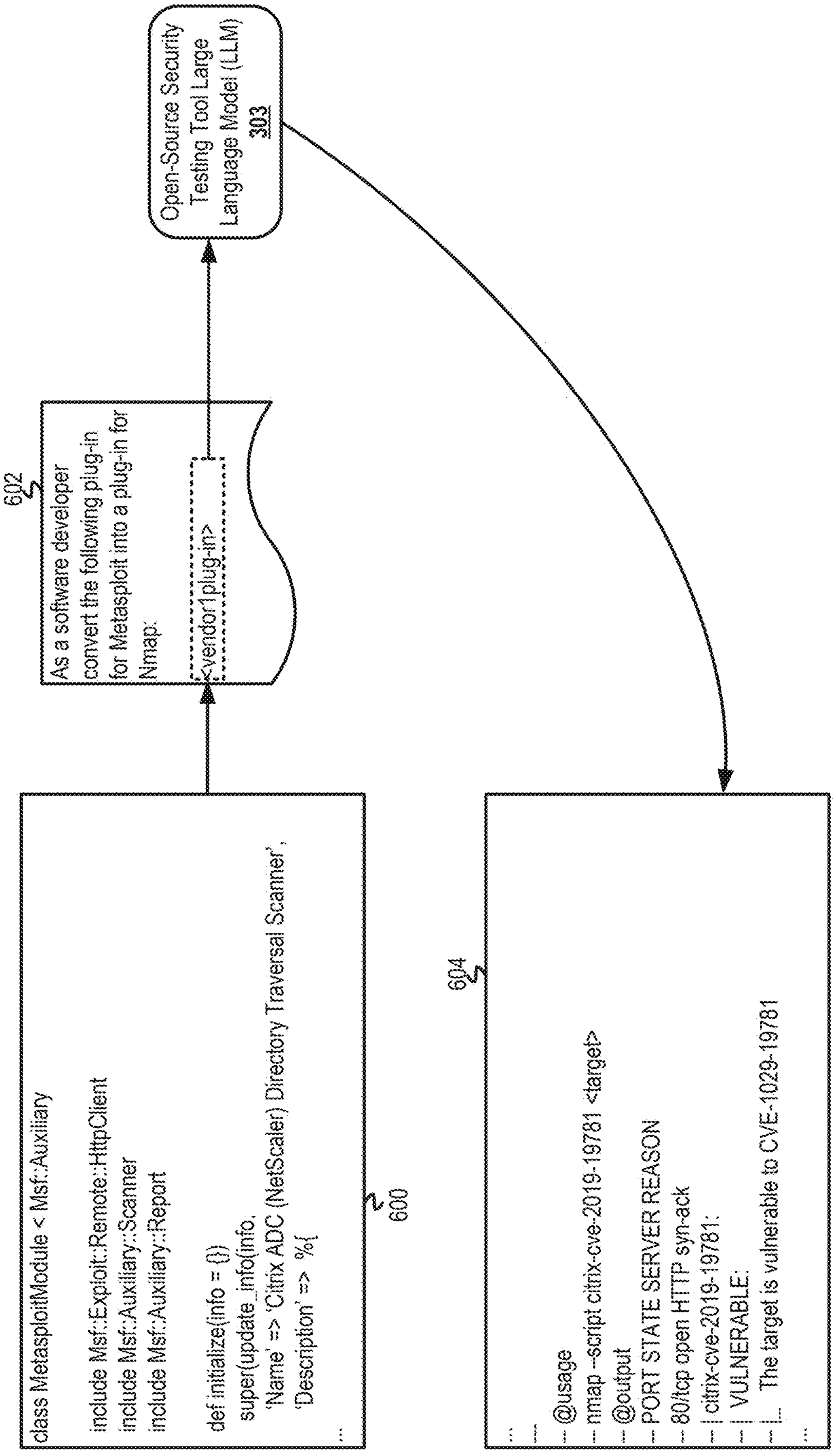
FIG. 6 is an illustrative diagram of an example plug-in for an open-source security testing tool generated based on an existing plug-in using an LLM.

FIG. 6 is an illustrative diagram of an example plug-in for an open-source security testing tool generated based on an existing plug-in using an LLM. Example existing plug-in 600 for the Metasploit® Project comprises the following Metasploit module:

```
class MetasploitModule < Msf::Auxiliary
   include Msf::Exploit::Remote::HttpClient
   include Msf::Auxiliary::Scanner
   include Msf::Auxiliary::Report
   def initialize(info = { })
     super(update_info(info,
        'Name' => 'Citrix ADC (NetScaler) Directory Traversal Scanner',
        'Description' => %{
...
```

An example prompt template 602 corresponding to both an existing plug-in for the Metasploit project as descriptive data and a target open-source security testing tool as the Nmap network scanner comprises the following (wherein the example existing plug-in 600 is inserted into the "<vendor1plug-in>" field):

As a software developer convert the following plug-in for Metasploit into a plug-in for Nmap
<vendor1plug-in_code>

The open-source security testing tool LLM 303 receives the example prompt template 602 populated with the example existing plug-in 600 as input and outputs example plug-in 604 comprising the following Nmap script:

```
...
---
-- @usage
-- nmap -script citrix-cve-2019-19781 <target>
-- @output
-- PORT STATE SERVER REASON
-- 80/tcp open HTTP syn-ack
-- | citrix-cve-2019-19781:
-- | VULNERABLE:
-- |_   The target is vulnerable to CVE-1029-19781
...
```

FIGS. 7-10 are flowcharts of example operations. The example operations are described with reference to a security feed network traffic extraction/generation system (traffic generation system), a prompt generator, an open-source foundation model, and a custom foundation model for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 7:
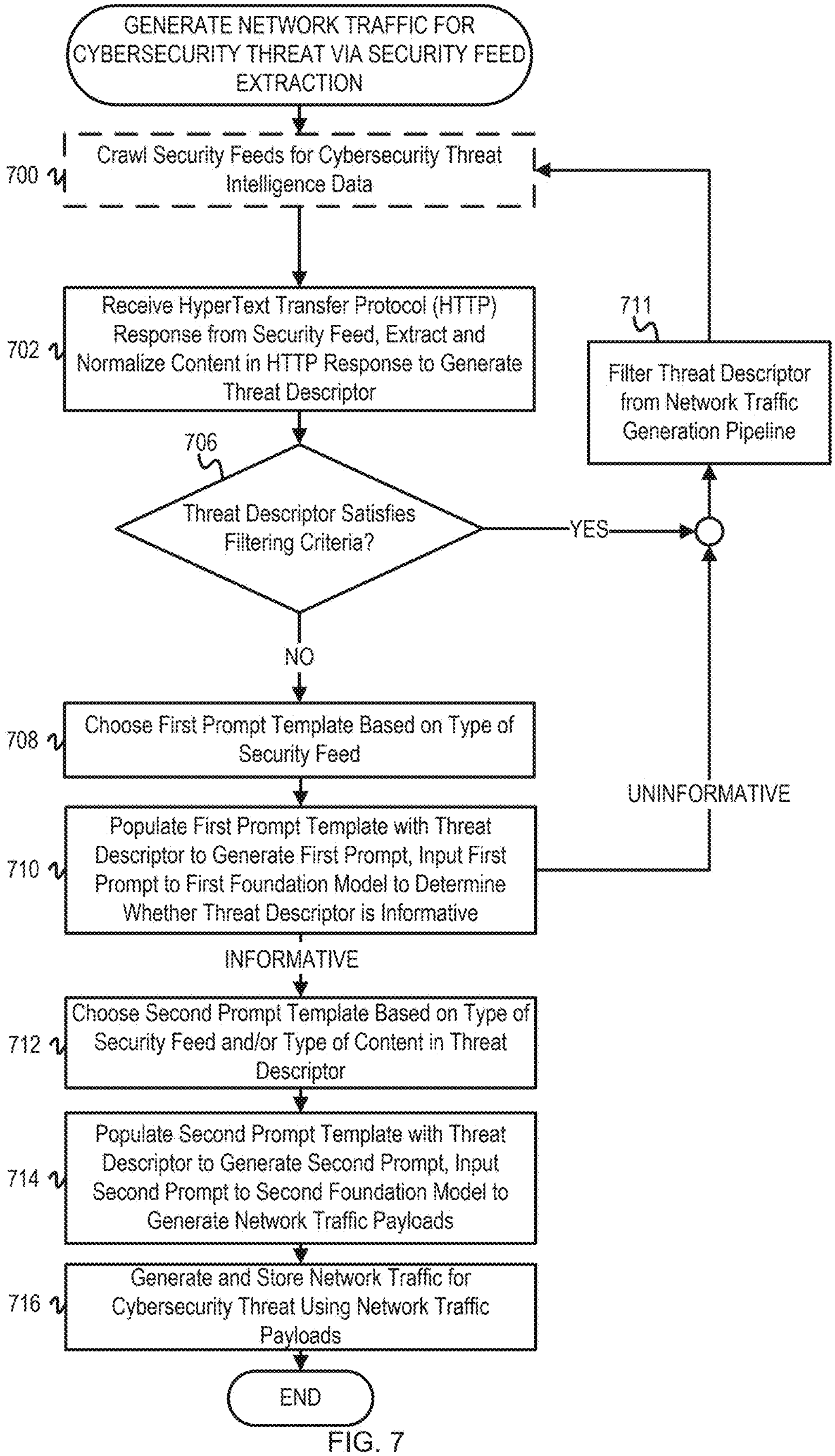
FIG. 7 is a flowchart of example operations for generating network traffic for a cybersecurity threat via security feed extraction.

FIG. 7 is a flowchart of example operations for generating network traffic for a cybersecurity threat via security feed extraction. At block 700, the traffic generation system crawls security feeds for cybersecurity threat intelligence data. The traffic generation system can crawl the Internet for HTTP responses from security feeds, for instance by crawling websites known to provide security feeds (e.g., blog websites, news websites, social media websites, etc.). The data types and data presented from crawled security feeds can comprise plaintext data, image data, executable code, etc. that describes cybersecurity threats/exploits, network traffic information/payloads/captures, PoC code (e.g., pseudocode or code in varying programming languages), etc. The traffic generation system can crawl each security feed according to a schedule (e.g., based on its crawling policy), and can crawl more active security feeds more frequently. In some embodiments, the traffic generation system can access an internal cybersecurity-related database (e.g., of a corresponding organization) that is updated with data crawled from security feeds. Block 700 is depicted with a dashed outline to indicate that the traffic generation system crawls security feeds for cybersecurity threat intelligence data independently from subsequent operations for generating network traffic of cybersecurity threats from the crawled data and can store the crawled data in a database in the interim prior to network traffic being generated. Crawling of security feeds can be ongoing or performed intermittently.

At block 702, the traffic generation system receives an HTTP response from a security feed and extracts and normalizes content in the HTTP response to generate a threat descriptor. The traffic generation system can extract and normalize content according to known formats/types of content for a corresponding security feed. For instance, a vulnerability database website can have known formats for each catalogued vulnerability including defined headers and sections specified in HTML code for each vulnerability (e.g., a header including a Common Vulnerabilities and Exposures (CVE) identifier, a brief description, and a list of hyperlinks describing the vulnerability). For HTTP responses not having predefined/known formats, the traffic generation system can extract content by rendering the corresponding web page and normalizing data in the corresponding web page according to its type (e.g., plaintext data, image data, program code, etc.). For instance, images can be converted to a standard image format, HTML formatting of plaintext can be removed and/or separated by headers or paragraphs, etc.

At block 706, the traffic generation system determines whether the threat descriptor satisfies filtering criteria. The filtering criteria can comprise whether the threat descriptor has already been used for traffic generation, for instance when identical or substantially similar threat descriptors occur multiple times across security feeds. The filtering criteria can additionally or alternatively comprise whether the severity score (e.g., the CVSS score) of the corresponding cybersecurity threat, vulnerability, exploit, etc. is below a threshold severity score. If the threat descriptor has already been used for traffic generation, the severity score is below the threshold severity score, and/or other filtering criteria are satisfied, operational flow proceeds to block 711. Otherwise, operational flow proceeds to block 708.

At block 708, the traffic generation system chooses a first prompt template based on the type of security feed. The first prompt template describes the type of security feed (e.g., blog, social media website, public vulnerability database, etc.) and comprises instructions to determine whether a threat descriptor comprises sufficient information for generating network traffic of the cybersecurity threat described therein. The first prompt template can additionally comprise instructions to act as a cybersecurity expert and can include one or more examples of threat descriptors for the type of security feed and corresponding indications of whether those threat descriptors comprise sufficient information for generating network traffic of corresponding cybersecurity threats. The examples for each prompt template/security feed type can be curated by a domain-level expert and iteratively improved based on evaluating network traffic for cybersecurity threat generated as a result of the operations depicted in FIG. 7. These examples can alternatively be used to fine-tune a foundation model for which the prompt template will be used.

At block 710, the traffic generation system populates the first prompt template with the threat descriptor to generate a first prompt and inputs the first prompt to a first foundation model to determine whether the threat descriptor is informative. The threat descriptor is informative if the threat descriptor comprises sufficient information for the first foundation model to reproduce and/or generate network traffic of the cybersecurity threat described by the threat descriptor. If output of the first foundation model indicates that the threat descriptor is informative, operational flow proceeds to block 712. Otherwise, operational flow proceeds to block 711.

At block 711, if the threat descriptor was determined to satisfy filtering criteria or to be uninformative (e.g., at blocks 706 or 710, respectively), the traffic generation system filters the threat descriptor out from subsequent operations in the network traffic generation pipeline. Operational flow returns to block 700 for additional crawling of security feeds for cybersecurity threat intelligence data.

At block 712, the traffic generation system chooses a second prompt template based on the type of security feed and/or type of content in the threat descriptor. The choices of prompt templates can comprise a prompt template for each security feed type/content type pair or prompt templates for specific security feed types and specific content types. In some embodiments, when there is a distinct prompt template choice for both the security feed type and the content type, the prompt template choice for the content type can be chosen as having high priority over the prompt template choice for the security feed type.

At block 714, the traffic generation system populates the second prompt template with the threat descriptor to generate a second prompt and inputs the second prompt into a second foundation model to generate network traffic payloads for the cybersecurity threat corresponding to the threat descriptor. The second prompt template comprises instructions to, as a network traffic expert, extract and/or generate (e.g., depending on the security feed type for the second prompt template) network traffic from data included in the threat descriptor (e.g., image data, normalized security feed data of a particular type, pseudocode, program code of a specified programming language, etc.). The second prompt template can additionally comprise instructions to include example values instead of random variables in the network traffic.

At block 716, the traffic generation system generates and stores network traffic for the cybersecurity threat using the network traffic payloads. For instance, the traffic generation system can implement a script that obtains packet captures from the network traffic payloads as the network traffic. The network traffic is stored in a database for subsequent analysis of the cybersecurity threat.

Figure 8:
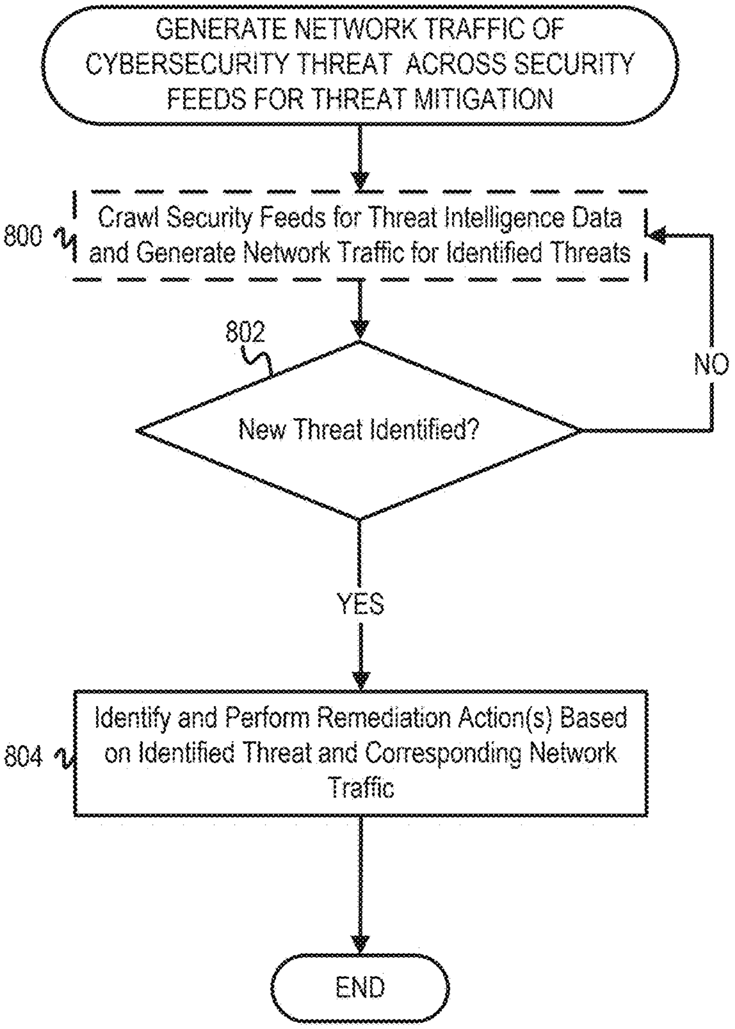
FIG. 8 is a flowchart of example operations for generating network traffic of a cybersecurity threat across security feeds for threat mitigation.

FIG. 8 is a flowchart of example operations for generating network traffic of a cybersecurity threat across security feeds for threat mitigation. At block 800, the traffic generation system crawls security feeds for threat intelligence data and generates network traffic for the identified threats. The operations at block 800 can be performed, for each identified threat, in substantially the same way as the operations described in reference to FIG. 7, and operations for network traffic generation of identified threats can be performed in parallel across identified threats. Block 800 is depicted with a dashed outline to indicate that these operations occur independently of the remaining operations in FIG. 8, which are initiated when a new threat has been identified.

At block 802, if the traffic generation system determines that a new threat has been identified and corresponding traffic has been generated for the new threat, operational flow proceeds to block 804. Otherwise, operational flow returns to block 800 for additional crawling/network traffic generation.

At block 804, the traffic generation system identifies and performs a remediation action(s) based on the identified threat and corresponding network traffic. The subsequent operations in FIGS. 9 and 10 describe using generated network traffic (among other types of descriptive data) to generate a plug-in for an open-source and/or custom security testing tool. These operations can be used for performing the remediation action(s) at block 804 by generating a plug-in corresponding to the identified threat using the generated network traffic and performing functionalities enabled by the corresponding security testing tool. These functionalities (that may also be performed without use of a security testing tool plug-in) include scanning for a corresponding vulnerability/weakness in network traffic, generating attack variants, generating IPS signatures, etc. of the identified threat.

Figure 9:
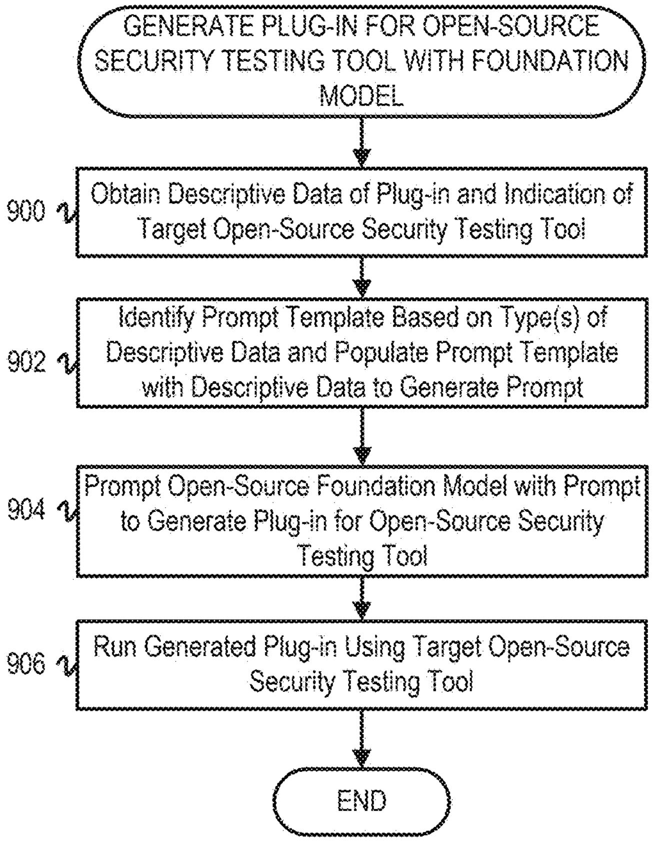
FIG. 9 is a flowchart of example operations for generating a plug-in for an open-source security testing tool with a foundation model.

FIG. 9 is a flowchart of example operations for generating a plug-in for an open-source security testing tool with a foundation model. At block 900, the prompt generator obtains descriptive data for a plug-in and an indication of a target open-source security testing tool for the plug-in. The descriptive data can comprise PoC code, network traffic payloads and/or captures, existing security testing tool plug-ins (for distinct security testing tools from the target), etc. The prompt generator can obtain the descriptive data via a user interface or other input module where a domain-level expert can specify a target security testing tool among a list of supported security testing tools (e.g., having supported prompt templates and/or LLMs according to the subsequent operations in FIG. 9).

At block 902, the prompt generator identifies a prompt template based on the type(s) of descriptive data and populates the prompt template to generate a prompt. Each prompt template corresponds to one or more types of descriptive data and (at least) the target open-source security testing tool. As an example, when the descriptive data is an existing plug-in, the prompt template comprises instructions to, as a software developer, convert the existing plug-in into a plug-in for the target open-source security testing tool (e.g., as identified in the prompt template by a vendor of the target open-source testing tool). The prompt template can additionally specify details of the target open-source security testing tool such as preferred libraries, supported functionalities, etc. The level of detail provided for the target open-source security testing tool by the prompt template can vary depending on the familiarity (e.g., based on pre-training for general natural language tasks) of an open-source foundation model with the target open-source security testing tool.

At block 904, the prompt generator prompts the open-source foundation model with the prompt to generate a plug-in for the open-source testing tool. The open-source foundation model comprises a foundation model that is configured, trained, prompt-tuned, and/or fine-tuned for generating plug-ins for at least the target open-source security testing tool and possibly other security testing tools. In some embodiments, a domain-level expert that initially submitted the descriptive data can evaluate the generated plug-in for correctness (i.e., that the functionality and/or syntax is correct). For an incorrect plug-in, the domain-level expert can instruct the prompt generator to input the prompt to the open-source foundation model again/repeatedly to attempt to leverage temperature/randomness of the open-source foundation model to obtain a correct plug-in.

At block 906, the prompt generator (or other component) runs the generated plug-in using the target open-source security testing tool. The prompt generator can perform functionalities enabled by the generated plug-in (e.g., scanning of network traffic for a corresponding threat/vulnerability) and/or functionalities enabled by the target open-source security testing tool. As similarly described above in reference to block 904, if the generated plug-in is determined to be incorrect on runtime, the domain-level expert and/or the prompt generator can resubmit the prompt to the open-source foundation model to attempt to generate a correct plug-in.

Figure 10:
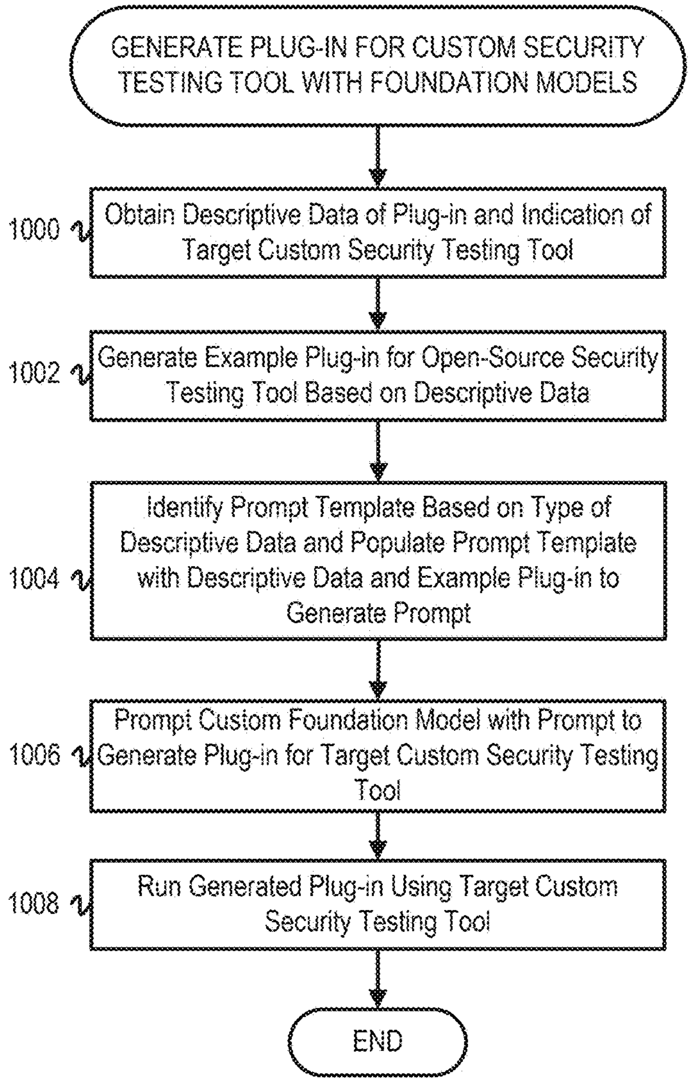
FIG. 10 is a flowchart of example operations for generating a plug-in for a custom security tool with foundation models.

FIG. 10 is a flowchart of example operations for generating a plug-in for a custom security tool with foundation models. Many of the operations in reference to FIG. 10 are described concisely due to overlap with operations described in reference to FIG. 9. At block 1000, the prompt generator obtains descriptive data of a plug-in and an indication of a target custom security testing tool. The operations described at block 1000 can be substantially similar to the operations described at block 900 in reference to FIG. 9, with the modification that a custom security testing tool instead of an open-source security testing tool is indicated.

At block 1002, the prompt generator generates an example plug-in for an open-source security testing tool based on descriptive data. The open-source security testing tool can be a security testing tool that is well-understood by a corresponding foundation model, e.g., the open-source foundation model, improving quality/correctness of the example plug-in. The operations at block 1002 can be performed substantially similarly to the operations described at blocks 902 and 904 in reference to FIG. 9.

At block 1004, the prompt generator identifies a prompt template based on the type of descriptive data and populates the prompt template with the descriptive data and the example plug-in to generate a prompt. By contrast with prompt templates used for plug-ins of open-source security testing tools, the choices of prompt templates can comprise more descriptive prompt templates. For instance, the prompt templates can additionally describe formats, schema, programming languages, etc. for plug-ins of the target custom security testing tool.

At block 1006, the prompt generator prompts the target custom foundation model with the prompt to generate a plug-in for the custom security testing tool. At block 1008, the prompt generator runs the generated plug-in using the target custom security testing tool. As described in the foregoing, the prompt generator may re-prompt the custom foundation model (e.g., with the same prompt) when the generated plug-in is incorrect, and running the generated plug-in may utilize functionality of both the generated plug-in and of the target custom security testing tool.

Variations

Any of the LLMs described in the foregoing can be off-the-shelf LLMs (e.g., the OpenAI GPT-4 LLM, the Meta Llama 3 LLM, etc.) that are fine-tuned, prompt-tuned, and/or one-or few-shot prompted for their respective tasks, or can be any foundation models or language models configured/trained for their respective tasks, e.g., transformers neural networks, machine learning classifiers (depending on the task), etc. Examples used in training/one-or few-shot prompting/prompt-tuning/fine-tuning can be curated by domain-level experts in respective fields. Instances of multiple LLMs used in a pipeline can be alternatively implemented with a single LLM and a prompt modified to be an amalgamation of the individual prompts of the LLMs in the pipeline with clarifying instructions included.

The foregoing description refers to "uninformative" threat descriptors as threat descriptors that do not include sufficient information for reproducing or generating network traffic related to a cybersecurity threat. These uninformative threat descriptors may not be uninformative outside of the context of reproducing or generating network traffic—for instance they can provide many details related to cybersecurity threats, exploits, vulnerabilities, and weaknesses while not specifically describing enough detail for reproducing/generating network traffic. This can include threat descriptors that describe affected products/versions, version upgrades to remediate vulnerabilities, etc.

Prompt templates used for prompting LLMs to generate plug-ins for custom security testing tools according to the foregoing description may not take an example plug-in for an open-source security testing tool as input. For instance, a prompt template may only be populated with descriptive data for a plug-in (e.g., PoC code, network traffic captures/payloads) to generate a prompt used to prompt an LLM to generate a custom plug-in.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 7 can be performed in parallel and concurrently across threat descriptors of cybersecurity threats. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 11:
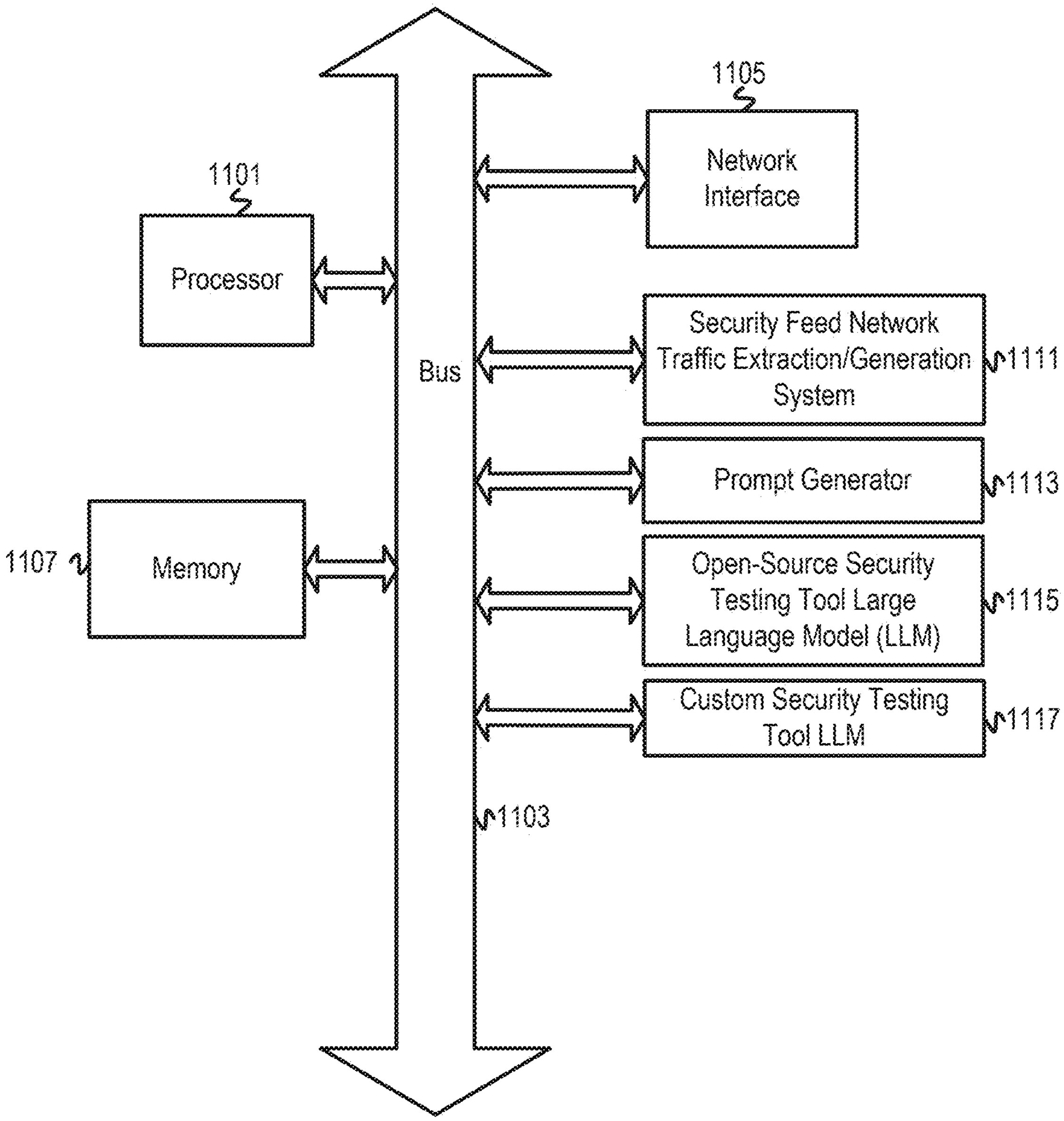
FIG. 11 depicts an example computer system with a security feed network traffic extraction/generation system, a prompt generator, an open-source testing tool LLM, and a custom testing tool LLM.

FIG. 11 depicts an example computer system with a security feed network traffic extraction/generation system, a prompt generator, an open-source testing tool LLM, and a custom testing tool LLM. The computer system includes a processor 1101 (possibly including multiple processors, multiple cores, multiple nodes, and/or implementing multi-threading, etc.). The computer system includes memory 1107. The memory 1107 may be system memory or any one or more of the above already described possible realizations of machine-readable media. The computer system also includes a bus 1103 and a network interface 1105. The system also includes a security feed network traffic extraction/generation system (traffic generation system) 1111, a prompt generator 1113, an open-source security testing tool LLM (open-source LLM) 1115, and a custom security testing tool (custom LLM) 1117. The traffic generation system 1111 aggregates and normalizes cybersecurity intelligence data across security feeds to obtain threat descriptors. The traffic generation system 1111 comprises a first LLM that determines whether each threat descriptor is informative (i.e., comprises sufficient information to reproduce/generate network traffic of a corresponding cybersecurity threat) and a second LLM that generates example network traffic for informative threat descriptors. The traffic generation system 1111 (or other cybersecurity systems) uses the network traffic for cybersecurity threat remediation. The prompt generator 1113 receives descriptive data (PoC code, network traffic, etc.) of a plug-in for a target security testing tool. When the target security testing tool is an open-source security testing tool, the prompt generator 1113 prompts the open-source LLM 1115 to generate a plug-in for the open-source security testing tool based on the descriptive data. When the target security testing tool is a custom security testing tool, the prompt generator 1113 first prompts the open-source LLM 1115 to generate an example plug-in based on the descriptive data, then prompts the custom LLM 1117 to generate a plug-in for the custom security testing tool based on the example plug-in and the descriptive data. While depicted as part of the same computer system in FIG. 11, any one or more of the traffic generation system 1111, the prompt generator 1113, the open-source LLM 1115, and the custom LLM 1117 do not necessarily execute as part of the same system. Any one of the previously described functionalities may be partially (or entirely) implemented in hardware and/or on the processor 1101. For example, the functionality may be implemented with an application specific integrated circuit, in logic implemented in the processor 1101, in a co-processor on a peripheral device or card, etc. Further, realizations may include fewer or additional components not illustrated in FIG. 11 (e.g., video cards, audio cards, additional network interfaces, peripheral devices, etc.). The processor 1101 and the network interface 1105 are coupled to the bus 1103. Although illustrated as being coupled to the bus 1103, the memory 1107 may be coupled to the processor 1101.

The invention claimed is:

1. A method comprising:

based on receiving a first plug-in and at least one of packet payloads, packet captures, and proof-of-concept code for a first security testing tool, generating one or more prompts comprising the first plug-in, a description of at least one of functionalities, modules, and metadata of a second security testing tool, and task instructions to convert the first plug-in to a plug-in for the second security testing tool, wherein the first plug-in comprises at least one of a first configuration file, a first script, and a first populated schema for the first security testing tool; and prompting a foundation model with the one or more prompts to obtain a second plug-in for the second security testing tool, wherein the second security testing tool comprises at least one of an open-source security testing tool and a custom security testing tool, wherein the second plug-in comprises at least one of a second configuration file, a second script, and a second populated schema for the second security testing tool.

2. The method of claim 1, wherein the second security testing tool is the custom security testing tool, wherein the description of at least one of the functionalities, the modules, and the metadata of the custom security testing tool comprises at least one of an indication of a programming language used to build the custom security testing tool, descriptions of libraries of the custom security testing tool, use cases of the custom security testing tool, and functionalities of the custom security testing tool.

3. The method of claim 1, wherein the first security testing tool is at least one of the Nmap® network scanner, the Metasploit® Project, and the Open Vulnerability Assessment Scanner.

4. The method of claim 1, wherein the foundation model comprises a large language model.

5. The method of claim 1, further comprising, integrating the second plug-in into the second security testing tool; and performing security testing with the integrated plug-in.

6. The method of claim 5, wherein performing security testing comprises at least one of testing for new vulnerabilities and generating new attack variants.

7. The method of claim 5, wherein performing security testing comprises performing security testing with functionalities enabled by the second security testing tool.

8. The method of claim 1, wherein the functionalities of the second security testing tool comprise at least one of scanning for at least one of vulnerabilities and weaknesses in network traffic, generating attack variants, and generating intrusion prevention system signatures.

9. A non-transitory, machine-readable medium having program code stored thereon, the program code comprising instructions to:

generate a first plug-in for a first security testing tool comprising a first open-source security testing tool or a custom security testing tool based on descriptive data for the first plug-in, wherein the descriptive data comprises a description of at least one of functionalities, modules, and metadata of the first security testing tool. wherein the instructions to generate the first plug-in comprise instructions to, generate a first prompt for a first foundation model, wherein the first prompt comprises the descriptive data and task instructions to generate the first plug-in for the first open-source security testing tool or the custom security testing tool based, at least in part, on the descriptive data and a type of the descriptive data; and prompt the first foundation model with the first prompt to obtain the first plug-in, wherein the first plug-in comprises at least one of a configuration file, a script, and a populated schema for the first security testing tool.

10. The machine-readable medium of claim 9, wherein the first security testing tool comprises the custom security testing tool, wherein the instructions to generate the first plug-in comprise instructions to:

generate a second prompt for a second foundation model, wherein the second prompt comprises the descriptive data, a description and/or indication of a second open-source testing tool, and task instructions to generate an example plug-in for the second open-source testing tool based, at least in part, on the type of the descriptive data;

prompt the second foundation model with the second prompt to obtain the example plug- in; and insert the example plug-in into the first prompt.

11. The machine-readable medium of claim 9, wherein the type of the descriptive data comprises at least one of network traffic payloads, network traffic captures, proof-of-concept code, and a second plug-in for a second security testing tool.

12. The machine-readable medium of claim 9, wherein the first security testing tool is the custom security testing tool, wherein the description of at least one of the functionalities, the modules, and the metadata of the custom security testing tool comprises at least one of an indication of a programming language used to build the custom security testing tool, descriptions of libraries of the custom security testing tool, use cases of the custom security testing tool, and functionalities of the custom security testing tool.

13. The machine-readable medium of claim 9, wherein the program code further comprises instructions to:

integrate the first plug-in into the first security testing tool; and perform security testing with the integrated plug-in.

14. The machine-readable medium of claim 13, wherein the instructions to perform security testing comprise instructions to at least one of test for new vulnerabilities and generate new attack variants.

15. An apparatus comprising:

a processor; and a machine-readable medium having instructions stored thereon that are executable by the processor to cause the apparatus to, obtain descriptive data for a first plug-in of a first security testing tool, wherein the descriptive data comprises a description of at least one of functionalities, modules, and metadata of the first security testing tool; and generate the first plug-in for the first security testing tool, wherein the first plug-in comprises at least one of a configuration file, a script, and a populated schema for the first security testing tool, wherein the instructions to generate the first plug-in comprise instructions executable by the processor to cause the apparatus to, based on the descriptive data indicating the first security testing tool is a first open-source security testing tool, prompting a first foundation model with a first prompt comprising the descriptive data, a description and/or indication of the first open-source security testing tool, and task instructions to generate the first plug-in for the first open-source security testing tool based, at least in part, on the descriptive data and a type of the descriptive data;

based on the descriptive data indicating the first security testing tool is a custom security testing tool, prompting a first foundation model with a second prompt comprising the descriptive data, a description and/or indication of the custom security testing tool, an example plug-in for a second open-source security testing tool, and task instructions to generate the first plug-in for the custom security testing tool, at least in part, on the descriptive data and a type of the descriptive data.

16. The apparatus of claim 15, wherein the type of the descriptive data comprises at least one of network traffic payloads, network traffic captures, proof-of-concept code, and a second plug-in for a second security testing tool.

17. The apparatus of claim 15, wherein the first security testing tool is the custom security testing tool, wherein the description of at least one of the functionalities, the modules, and the metadata of the custom security testing tool comprises at least one of an indication of a programming language used to build the custom security testing tool, descriptions of libraries of the custom security testing tool, use cases of the custom security testing tool, and functionalities of the custom security testing tool.

18. The apparatus of claim 15, wherein the machine-readable medium further has stored thereon instructions executable by the processor to cause the apparatus to:

integrate the first plug-in into the first security testing tool; and perform security testing with the integrated plug-in.

19. The apparatus of claim 18, wherein the instructions to perform security testing comprise instructions executable by the processor to cause the apparatus to at least one of test for new vulnerabilities and generate new attack variants.

20. The apparatus of claim 15, wherein the instructions to perform security testing comprise instructions executable by the processor to cause the apparatus to perform security testing with functionalities enabled by the first security testing tool.

* * * * *